(12) United States Patent
Kato

(10) Patent No.: US 9,813,681 B2
(45) Date of Patent: Nov. 7, 2017

(54) PHOTOELECTRIC CONVERSION APPARATUS

(71) Applicant: CANON KABUSHIKI KAISHA, Tokyo (JP)

(72) Inventor: Satoshi Kato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 197 days.

(21) Appl. No.: 14/918,799

(22) Filed: Oct. 21, 2015

(65) Prior Publication Data

US 2016/0044288 A1 Feb. 11, 2016

Related U.S. Application Data

(62) Division of application No. 13/773,121, filed on Feb. 21, 2013, now Pat. No. 9,197,833.

(30) Foreign Application Priority Data

Feb. 29, 2012 (JP) ................ 2012-043765

(51) Int. Cl.
| | |
|---|---|
| H04N 5/14 | (2006.01) |
| H04N 9/04 | (2006.01) |
| H04N 5/376 | (2011.01) |
| H04N 5/369 | (2011.01) |
| H04N 5/378 | (2011.01) |

(52) U.S. Cl.
CPC .......... *H04N 9/045* (2013.01); *H04N 5/3692* (2013.01); *H04N 5/378* (2013.01); *H04N 5/3765* (2013.01)

(58) Field of Classification Search
CPC ...... H04N 9/045; H04N 5/378; H04N 5/3692; H04N 5/3765
See application file for complete search history.

(56) References Cited

U.S. PATENT DOCUMENTS

| | | | |
|---|---|---|---|
| 7,817,199 | B2 | 10/2010 | Yamashita et al. |
| 8,084,729 | B2 | 12/2011 | Kato et al. |

(Continued)

FOREIGN PATENT DOCUMENTS

| | | |
|---|---|---|
| JP | 5-122542 | 5/1993 |
| JP | 5-284374 | 10/1993 |
| JP | 2006-5592 | 1/2006 |

OTHER PUBLICATIONS

Japanese Office Action dated Jan. 10, 2017 during prosecution of related Japanese application No. 2013-029031.

*Primary Examiner* — Tony Ko
(74) *Attorney, Agent, or Firm* — Fitzpatrick, Cella, Harper & Scinto

(57) ABSTRACT

A photoelectric conversion apparatus of the present invention includes: a plurality of pixel arrays having different colors and arrayed in the subsidiary scanning direction when the photoelectric conversion apparatus scans a document relatively in the subsidiary scanning direction, each of the plurality of pixel arrays including a plurality of pixels that perform photoelectric conversion; and a pulse controlling unit which controls pulse positions of control pulses that control operations of the pixels, wherein the pulse controlling unit controls the pulse positions of the control pulses for the pixel arrays of each color, according to color offset quantities in the subsidiary scanning direction of the pixel arrays of each color.

7 Claims, 15 Drawing Sheets

(56) References Cited

U.S. PATENT DOCUMENTS

| | | |
|---|---|---|
| 8,154,639 B2 | 4/2012 | Kato et al. |
| 8,159,582 B2 | 4/2012 | Kato et al. |
| 2004/0189657 A1 | 9/2004 | Ikeda et al. |
| 2010/0073537 A1 | 3/2010 | Kato et al. |
| 2011/0074994 A1 | 3/2011 | Wakabayashi et al. |
| 2013/0313413 A1 | 11/2013 | Kato |
| 2016/0248942 A1* | 8/2016 | Horita .................. H04N 1/6019 |

* cited by examiner

PHOTOELECTRIC CONVERSION APPARATUS

This application is a Division of application Ser. No. 13/773,121 filed Feb. 21, 2013, which in turn claims benefit of Japanese Application No. 2012-043765 filed Feb. 29, 2012.

BACKGROUND OF THE INVENTION

Field of the Invention

The present invention relates to a photoelectric conversion apparatus which is used in a copying machine, an image scanner or the like.

Description of the Related Art

A structure having a line sensor in which each pixel array of red (R), green (G) and blue (B) is arranged in a direction perpendicular to an array direction at a predetermined interval is known, as one example of a photoelectric conversion apparatus. An image can be read out by moving the line sensor relatively with respect to a document in a subsidiary scanning direction. In such a photoelectric conversion apparatus, a technology is disclosed as a measure of electrically reducing a color offset in the subsidiary scanning direction, which is shown in Japanese Patent Application Laid-Open No. H05-122542 (hereinafter referred to as Patent Document 1). Patent Document 1 describes a technique for correcting the color offset with a correction unit in the rear stage of a sensor based on a correction factor which has been calculated beforehand at every pixel position.

However, in Patent Document 1, the correction factor according to the color offset quantity is held in an external memory, and when a signal from the sensor is output, an offset correcting unit retrieves the correction factor in the external memory and corrects the signal therewith. However, in this case, the signal processing unit can become complicated due to the correction processing which is performed in a circuit in the rear stage. Alternatively, a circuit scale can be enlarged.

One embodiment of the present invention can suppress the enlargement of the circuit scale of the whole system. Alternatively, the one embodiment can reduce the color offset in the subsidiary scanning direction by a simple control for a control pulse.

SUMMARY OF THE INVENTION

According to one embodiment of the present invention, a photoelectric conversion apparatus comprises: a plurality of pixel arrays, each pixel array including a plurality of pixels, and each pixel array corresponding to each of colors different from each other; and a pulse controlling unit for generating a pulse controlling an operation of the pixel array, wherein the plurality of pixel arrays are arranged abutting side by side is a first direction, the pulse controlling unit controls a timing of the control pulse to be supplied to the pixel array of each color, according to a color offset quantity formed in the first direction of the pixel array of each color.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
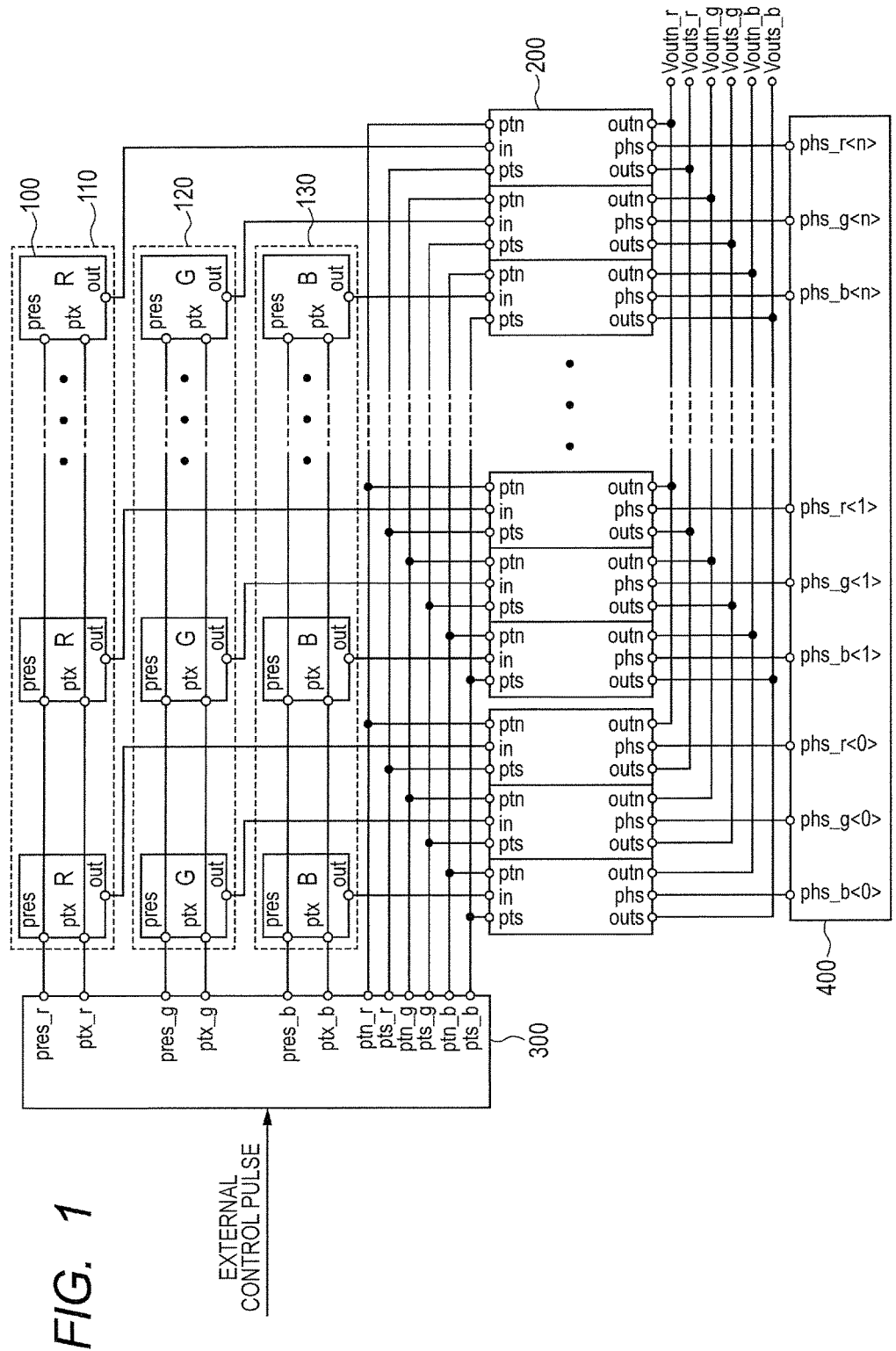
FIG. 1 is a block diagram illustrating a configuration example of a photoelectric conversion apparatus according to one embodiment of the present invention.
Figure 2:
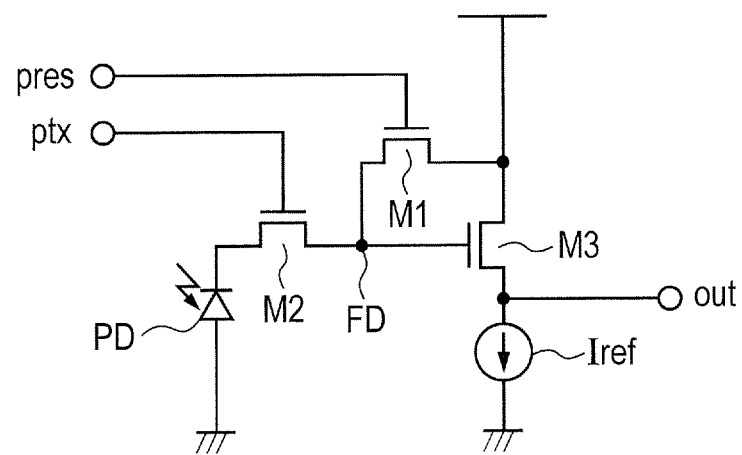
FIG. 2 is a circuit diagram illustrating a configuration example of a pixel in the block diagram of FIG. 1.

FIG. 1 illustrates a configuration example of a photoelectric conversion apparatus according to one embodiment of the present invention. A pixel 100 may comprise a circuit illustrated in FIG. 2. Incidentally, as is illustrated in FIG. 2, the pixel 100 can be controlled by control pulses pres and ptx. A photo diode PD converts light into an electric charge through photoelectric conversion, and can accumulate the converted electric charge therein. A signal charge which has been generated in a photoelectric conversion unit is transferred to a floating diffusion FD. A reset pulse pres is applied to a gate of a reset transistor M1, and thereby can control a reset operation of the photo diode PD and the floating diffusion FD in the pixel 100. In other words, the reset pulse pres is a control pulse for controlling the reset operation of the pixel 100. In addition, a transfer pulse ptx is applied to a gate of a transfer transistor M2, and thereby can control an operation of transferring an electric charge to the floating diffusion FD from the photo diode PD. An amplification transistor M3 outputs a signal according to a potential of the floating diffusion FD to an output terminal out. The amplification transistor M3 can constitute a source follower circuit together with a current source Iref.

Figure 5:
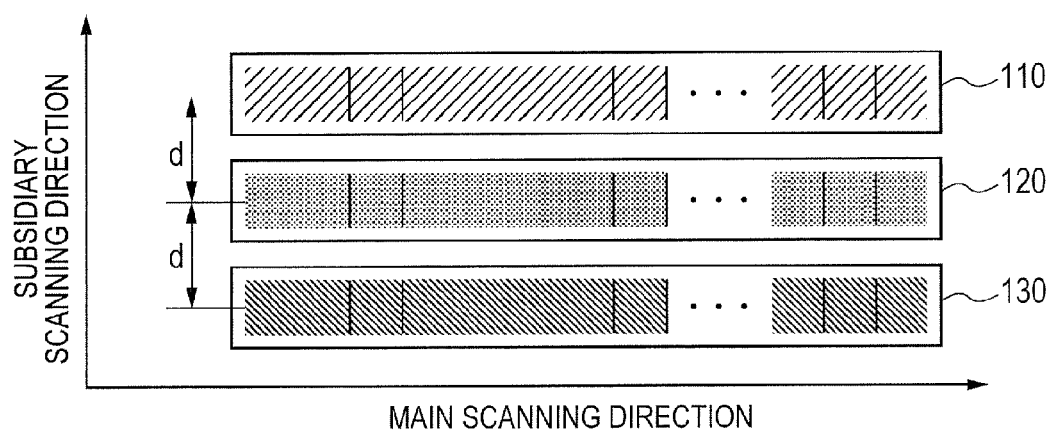
FIG. 5 is a view illustrating an arrangement example of pixel arrays for each color of the photoelectric conversion apparatus in FIG. 1.

In FIG. 1, an R-pixel array 110 may comprise a plurality of pixels 100 corresponding to a red color (R). For instance, the R-pixel array is configured to have an optical filter which transmits a light in a wavelength region of a red color therethrough arranged on its upper face. A G-pixel array 120 may comprise a plurality of pixels 100 corresponding to a green color (G). For instance, the G-pixel array is configured to have an optical filter which transmits a light in a wavelength region of a green color therethrough arranged on its upper face. A B-pixel array 130 can include a plurality of pixels 100 corresponding to a blue color (B). For instance, the B-pixel array 130 is configured to have an optical filter which transmits a light in a wavelength region of a blue color therethrough arranged on its upper face. The R-pixel array 110, the G-pixel array 120 and the B-pixel array 130 can be arranged at a fixed interval d, as is illustrated in FIG. 5. Incidentally, an array direction of the R-pixel array 110, the G-pixel array 120 and the B-pixel array 130 in FIG. 5 shall be hereafter referred to as a second direction, and a direction different from the second direction shall be hereafter referred to as a first direction. The first direction and the second direction may be perpendicular to each other. The first direction can be referred to as a subsidiary scanning direction, and the second direction can be referred to as a main scanning direction.

Figure 3:
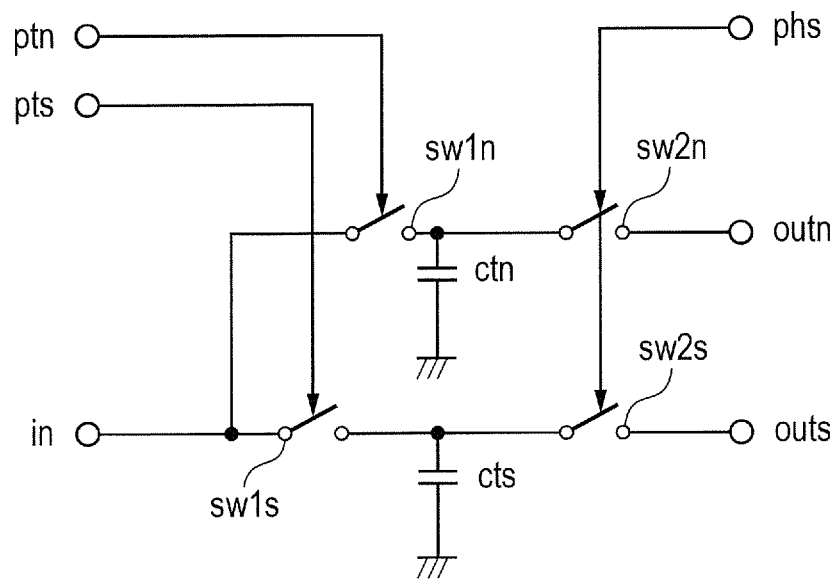
FIG. 3 is a circuit diagram illustrating a configuration example of a holding unit in the block diagram of FIG. 1.

A holding unit 200 can hold an output signal sent from the pixel 100. The holding unit 200 has, for instance, a circuit configuration as illustrated in FIG. 3. In FIG. 3, a capacitor ctn holds a signal output when the pixel 100 has been reset by the reset pulse pres, and a sampling and holding operation is controlled by the closing and opening of a switch sw1n by a read out pulse ptn. A capacitor cts holds an optical signal of the pixel 100, and the sampling and holding operation is controlled by the closing and opening of a switch sw1s by a read out pulse pts. The signals held in the capacitors cts and ctn are output to output terminals outn and outs, when a pulse phs turns to a high level and switches sw2 and sw2s are turned on.

A pulse controlling unit 300 can generate a control pulse for controlling an operation of the pixel 100, and a pulse for controlling the operation of sampling and holding the charge as an output signal sent from the pixel 100 in a holding unit 200. The pulse controlling unit 300 can control a pulse position of each control pulse of the R-pixel array 110 and the holding unit 200 corresponding to the R-pixel array 110, the G-pixel array 120 and the holding unit 200 corresponding to the G-pixel array 120, and the B-pixel array 130 and the holding unit 200 corresponding to the B-pixel array 130, according to an external control pulse. Incidentally, a pres_r, a ptx_r, a ptn_r and a pts_r which are control pulses of the R-pixel array 110 and the holding unit 200 corresponding to the R-pixel array 110 shall be hereafter referred to as R control pulses. In addition, a pres_g, a ptx_g, a ptn_g and a pts_g which are control pulses of the G-pixel array 120 and the holding unit 200 corresponding to the G-pixel array 120 shall be hereafter referred to as G control pulses. Similarly, a pres_b, a ptx_b, a ptn_b and a pts_b which are control pulses of the B-pixel array 130 and the holding unit 200 corresponding to the B-pixel array 130 shall be hereafter referred to as B control pulses. Here, the pulses pres_r, pres_g and pres_b correspond to the pulse pres in FIG. 2, and the pulses ptx_r, ptx_g and ptx_b correspond to the pulse ptx in FIG. 2. In addition, the pulses ptn_r, ptn_g and ptn_b correspond to the pulse ptn in FIG. 3, and the pulses pts_r, pts_g and pts_b correspond to the pulse pts in FIG. 3.

A horizontal scanning circuit 400 can sequentially output the pulse phs to a plurality of the holding units 200. The signals of output terminals outn and outs of the holding unit 200 corresponding to the R-pixel array 110 are output to output terminals Voutn_r and Vouts_r. The signals of output terminals outn and outs of the holding unit 200 corresponding to the G-pixel array 120 are output to output terminals Voutn_g and Vouts_g. The signals of output terminals outn and outs of the holding unit 200 corresponding to the B-pixel array 130 are output to output terminals Voutn_b and Vouts_b.

Figure 14:
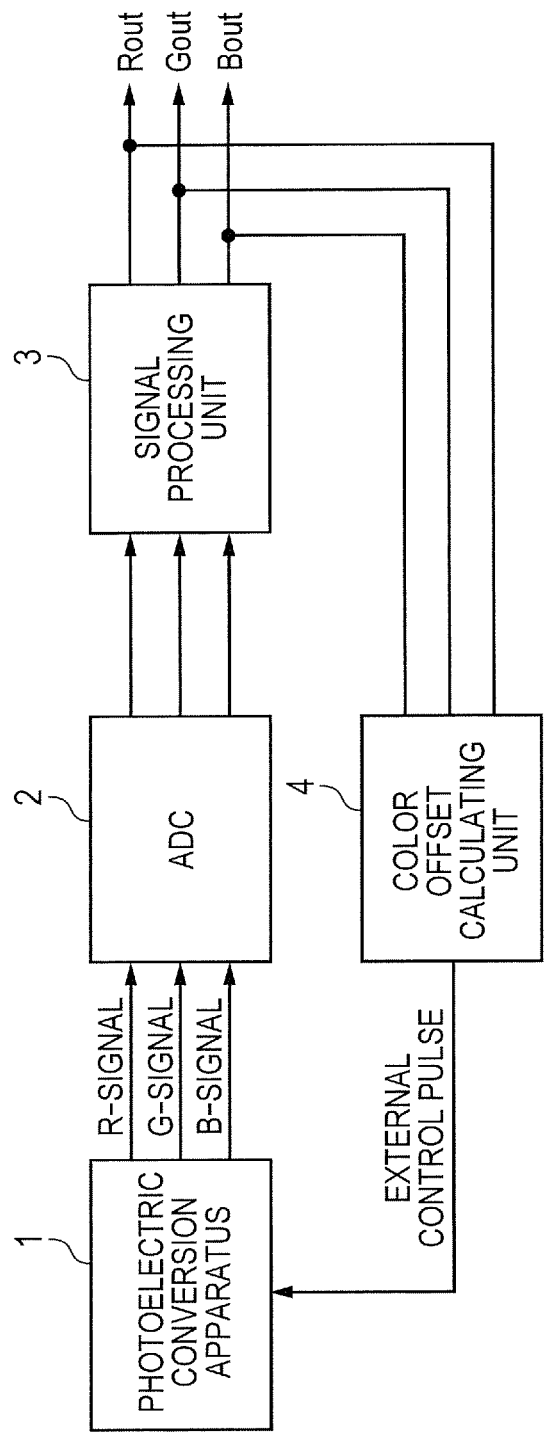
FIG. 14 is a view illustrating a configuration example of a system of a photoelectric conversion apparatus according to one embodiment of the present invention.

An operation of the circuit in FIG. 1 will be hereinafter described. Firstly, as is illustrated in FIG. 5, the R-pixel array 110 and the G-pixel array 120 are spaced at the fixed interval d, and the G-pixel array 120 and the B-pixel array 130 are also spaced at the fixed interval d. The photoelectric conversion apparatus makes a line sensor (which includes R-pixel array 110, G-pixel array 120 and B-pixel array 130) relatively scan (move) the document in a subsidiary scanning direction, and thereby reads out an image. In this case, the line sensor may be moved, or the document may be moved. A plurality of pixel arrays 110, 120 and 130 are arrayed so that the pixel arrays having different colors are adjacent to each other in the subsidiary scanning direction. Each of the pixel arrays 110, 120 and 130 has a plurality of pixels 100 which perform photoelectric conversion. The image reading out characteristics using the line sensor can be affected by physical displacement (fixed interval d) among imaging positions of each of the pixels 100 in the R-pixel array 110, the G-pixel array 120 and the B-pixel array 130, on an original image. The displacement can cause the displacement among the sampling positions for an image among each output of the R-pixel array 110, the G-pixel array 120 and the B-pixel array 130. This displacement shall be referred to as a color offset here. A positional relationship among each of the pixels 100 in the R-pixel array 110, the G-pixel array 120 and the B-pixel array 130 is kept constant while the photoelectric conversion apparatus or the document is moving in the subsidiary scanning direction, and accordingly the imaging position of each color at the same time results in being displaced by a degree corresponding to the interval d. Accordingly, when color signals of the R-pixel array 110, the G-pixel array 120 and the B-pixel array 130 are finally combined in consideration of this displacement, an appropriate image is obtained. However, the displacement can occur in a relationship among the sampling positions of each color, though the interval between the positions should be a fixed interval d, due to factors such as the chromatic aberration that an optical member provided between the original image and the photoelectric conversion apparatus has. When the color signals in the displaced state result in being combined as they are to form an image, the color offset can occur. Then, before the reading out of the original image starts, firstly, a pattern image for correction, which has been previously prepared, is read out. Subsequently, as is illustrated in FIG. 14, the R-signal, the G-signal and the B-signal which have been output from the photoelectric conversion apparatus 1 are converted into digital signals from analog signals by an analog-to-digital converter 2. Then, a signal processing unit 3 subjects the digital signals to a predetermined processing such as shading correction, outputs the R-signal, the G-signal and the B-signal to output terminals Rout, Gout and Bout, and simultaneously outputs color offset quantities or information on the color offset to a color offset calculating unit 4. The color offset calculating unit 4 calculates the color offset quantities in the subsidiary scanning direction of the R-signal, the G-signal and the B-signal based on the above described pattern image for correction, generates the external control pulses based on these color offset quantities, and outputs the generated external control pulses to the pulse controlling unit 300 (FIG. 1) in the photoelectric conversion apparatus 1. In other words, the color offset calculating unit 4 can calculate the color offset quantities in the subsidiary scanning direction when the plurality of the pixel arrays 110, 120 and 130 have scanned the pattern image for correction. The calculated color offset quantities can be the color offset quantities in the subsidiary scanning direction of the pixel arrays 110, 120 and 130 of each color. The pulse controlling unit 300 can control the pulse positions of the R control pulse, the G control pulse and the B control pulse, according to the input data of the external control pulses. Specifically, the pulse controlling unit 300 controls the control pulses which are supplied to the pixel arrays 110, 120 and 130 of each color, according to the color offset quantities which have been calculated by the color offset calculating unit. As for the control method, the pulse controlling unit controls, for instance, a timing of the pulse. Alternatively, the pulse controlling unit can control the pulse positions of the pixel arrays 110, 120 and 130 of each color. These control pulses are pulses for controlling an accumulation period of a charge generated by the photoelectric conversion in the pixel 100, and the pulse controlling unit can change the charge accumulation period by changing the pulse positions. Furthermore, changing the charge accumulation period means that the pulse controlling unit can change the sampling position.

As an example, the case will be described below where the displacement quantities of the imaging positions of the G-pixel array 120 and the B-pixel array 130 with respect to the imaging position of the R-pixel array 110 are represented by trg and trb, respectively, when the displacement quantities have been converted into timelike numeric values from the result of the color offset quantities in the subsidiary scanning direction calculated by the color offset calculating unit 4 in FIG. 14. In this case, the pulse position of the G control pulse can be shifted with respect to the R control pulse by a displacement quantity trg, and the pulse position of the B control pulse can be shifted with respect to the R control pulse by a displacement quantity trb. Thereby, the charge accumulation periods of the G-pixel array 120 and the B-pixel array 130 can be shifted by the displacement quantity trg and the displacement quantity trb with respect to the R-pixel array 110, respectively. The imaging positions of the G-pixel array 120 and the B-pixel array 130 are changed just by the displacement quantity corresponding to the charge accumulation period, and the displacement quantities of the imaging positions of the G-pixel array 120 and the B-pixel array 130 with respect to the R-pixel array 110 can be reduced.

Incidentally, a series of processings from the reading out of the above described pattern image for correction to the calculation of the color offset quantities may be performed every time before the original image is read out. Alternatively, operations up to the calculation of the color offset quantities are performed when the photoelectric conversion apparatus is inspected at a factory and is shipped from the factory, and the output color offset quantities may be held in an external memory or the like and may be continuously used afterward.

Figure 4:
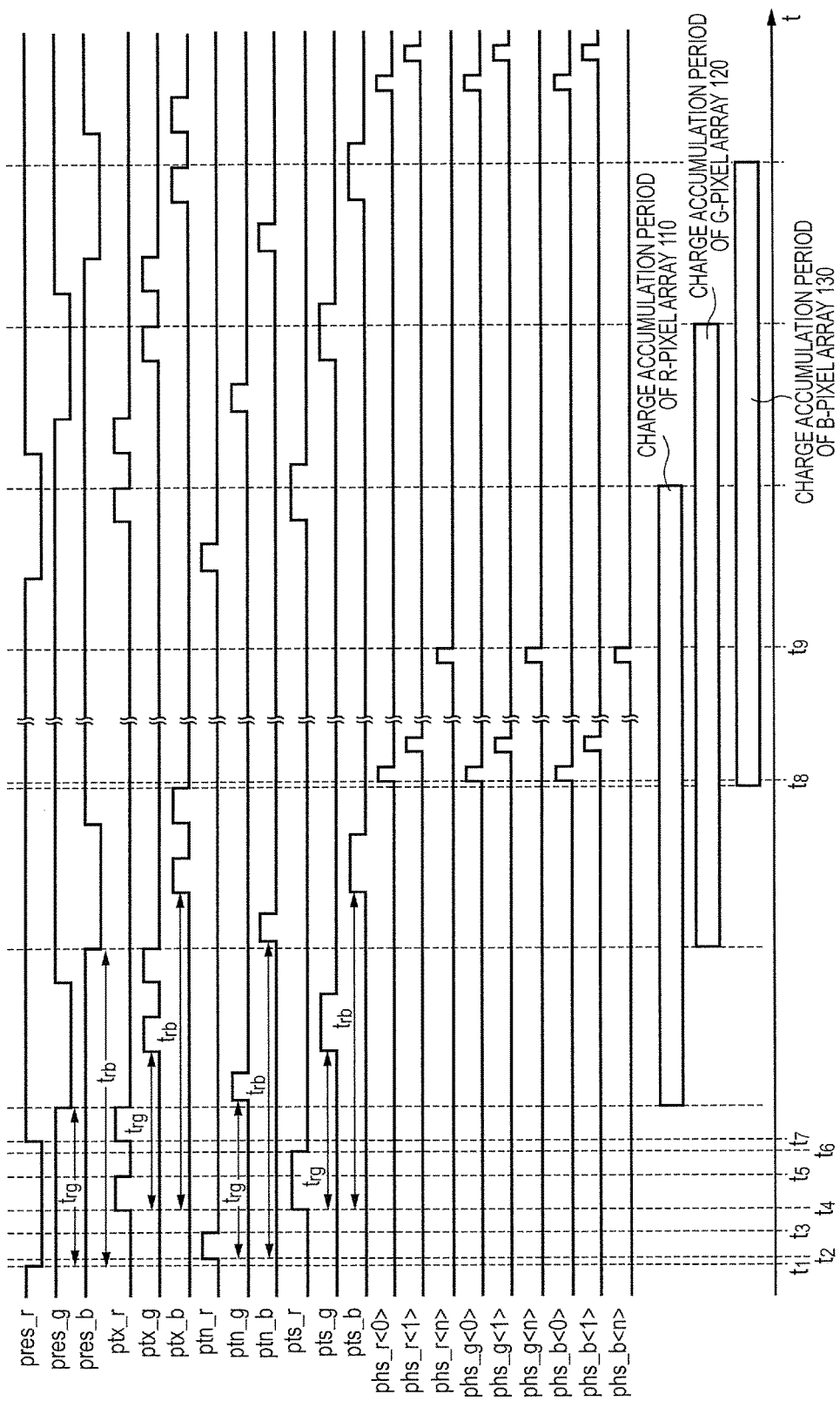
FIG. 4 is a timing chart illustrating an operation of the photoelectric conversion apparatus in FIG. 1.

FIG. 4 is a timing chart illustrating an operation of the photoelectric conversion apparatus in FIG. 1, and a detailed operation of the circuit in FIG. 1 will be hereinafter described with reference to FIG. 4. In FIG. 4, before the time t1, the reset pulses pres_r, pres_g and pres_b are in a high level, the reset transistor M1 is turned on, and the floating diffusion FD of all of the pixels 100 is reset to the power source potential. Incidentally, before that, the transfer pulse ptx_r turns to a high level, the transfer transistor M2 is turned on, and the photo diode PD of the R-pixel array 110 is also reset. After that, as will be described later, the transfer pulse ptx_r turns to a low level, the transfer transistor M2 is turned off, and the charge accumulation period of the photo diode PD of the R-pixel array 110 starts. After that, when the reset pulse pres_r turns to a low level at the time t1, the reset transistor M1 is turned off, and the reset for the floating diffusions FD of each of the pixels 100 in the R-pixel array 110 is released. When a read out pulse ptn_r turns to a high level during a period from the time t2 and the time t3, the switch sw1n is thereby turned on, and this reset signal is sampled and held by the capacitor ctn of the holding unit 200 corresponding to the R-pixel array 110. The read out pulse ptn_r is a control pulse for controlling the operation of sampling and holding the charge as the signal in the pixel 100.

Subsequently, the transfer pulse ptx_r turns to a high level during a period from the time t4 to the time t5, thereby the transfer transistor M2 is turned on, and the signal charges which have been accumulated in the photo diodes PD of each of the pixels 100 in the R-pixel array 110 are transferred to the floating diffusions FD. Incidentally, the time t5 becomes an end position of the charge accumulation period of the R-pixel array 110. When the switch sw1s is turned on by the pulse pts_r which turns to a high level during a period from the time t4 to the time t6, the optical signal based on this signal charge is sampled and held by the capacitor cts of the holding unit 200 corresponding to the R-pixel array 110. The read out pulse pts_r is a control pulse for controlling the operation of sampling and holding the charge as the signal in the pixel 100.

Next, at the time t7, the photoelectric conversion apparatus turns the pulses pres_r and ptx_r to a high level, turns the transistors M1 and M2 on, resets the photo diode PD and the floating diffusion FD, and then starts the accumulation of the electric charge in a next line. For this reason, the time when the transfer pulse ptx_r turns to a low level firstly after the time t7 and the transfer transistor M2 is turned off becomes a starting position of the charge accumulation period of the R-pixel array 110. The transfer pulse ptx_r is a control pulse for controlling an operation of transferring the electric charge, which determines the charge accumulation period of the pixel 100.

In the above description, the operation of the circuit has been described, which has been performed for the R-pixel array 110 and the holding unit 200 corresponding to the R-pixel array 110. The operation of the circuit can be performed also for the G-pixel array 120, the B-pixel array 130 and the holding units 200 each corresponding to the G-pixel array 120 and the B-pixel array 130 similarly, at the timings which have been shifted by the color offset quantities trg and trb, respectively. The operation timing of the G-pixel array 120 delays by the color offset quantity trg with respect to the operation timing of the R-pixel array 110, and the operation timing of the B-pixel array 130 delays by the color offset quantity trb with respect to the operation timing of the R-pixel array 110.

Specially, when the reset pulse pres_g turns to a low level, the reset transistor M1 is turned off, and the reset for the floating diffusions FD of each of the pixels 100 in the G-pixel array 120 is released. When the pulse ptn_g turns to a high level, the switch sw1n is thereby turned on, and the reset signal is sampled and held by the capacitor ctn of the holding unit 200 corresponding to the G-pixel array 120. Next, when the transfer pulse ptx_g turns to a high level, the transfer transistor M2 is thereby turned on, and the signal charges which have been accumulated in the photo diodes PD of each of the pixels 100 in the G-pixel array 120 are transferred to the floating diffusions FD. When the pulse pts_g turns to a high level, the switch sw1s is turned on, and the optical signal based on this signal charge is sampled and held by the capacitor cts of the holding unit 200 corresponding to the G-pixel array 120. Next, the photoelectric conversion apparatus turns the pulses pres_g and ptx_g to a high level, turns the transistors M1 and M2 on, resets the photo diode PD and the floating diffusion FD, and then starts the accumulation of the electric charge in a next line.

In addition, when the reset pulse pres_b turns to a low level, the reset transistor M1 is turned off, and the reset for the floating diffusions FD of each of the pixels 100 in the B-pixel array 130 is released. When the pulse ptn_b turns to a high level, the switch sw1n is thereby turned on, and the reset signal is sampled and held by the capacitor ctn of the holding unit 200 corresponding to the B-pixel array 130. Next, when the transfer pulse ptx_b turns to a high level, the transfer transistor M2 is thereby turned on, and the signal charges which have been accumulated in the photo diodes PD of each of the pixels 100 in the B-pixel array 130 are transferred to the floating diffusions FD. When the pulse pts_b turns to a high level, the switch sw1s is turned on, and the optical signal based on this signal charge is sampled and held by the capacitor cts of the holding unit 200 corresponding to the B-pixel array 130. Next, the photoelectric conversion apparatus turns the pulses pres_b and ptx_b to a high level, turns the transistors M1 and M2 on, resets the photo diode PD and the floating diffusion FD, and then starts the accumulation of the electric charge in a next line.

As described above, the pulse controlling unit 300 can control the variation quantities of the pulse positions of the reset pulse pres_g and the like, the transfer pulse ptx_g and the like, and the read out pulses ptn_g, pts_g and the like, by the color offset quantities trg and trb which are fixed for each color. When the reading out operation from the respective pixels 100 to the respective holding units 200 of each color of R, G and B has been completed, the pulse controlling unit performs the control which is shown during a period from the time t8 to the time t9. During the period from the time t8 to t9, the photoelectric conversion apparatus performs the reading out operation from the holding unit 200 to the outside, according to the pulses phs_r, phs_g and phs_b sent from a horizontal scanning circuit 400. The signal of each color, which is output at this time, can be a signal in a state where the color offset in the subsidiary scanning direction has been already reduced. Because of this, the photoelectric conversion apparatus does not need to have an arithmetic circuit and the like for performing a complicated operation in the circuit in the rear stage provided therein, can suppress the enlargement of the circuit scale of the whole system, and simultaneously can provide an image in which the color offset is reduced.

Figure 6:
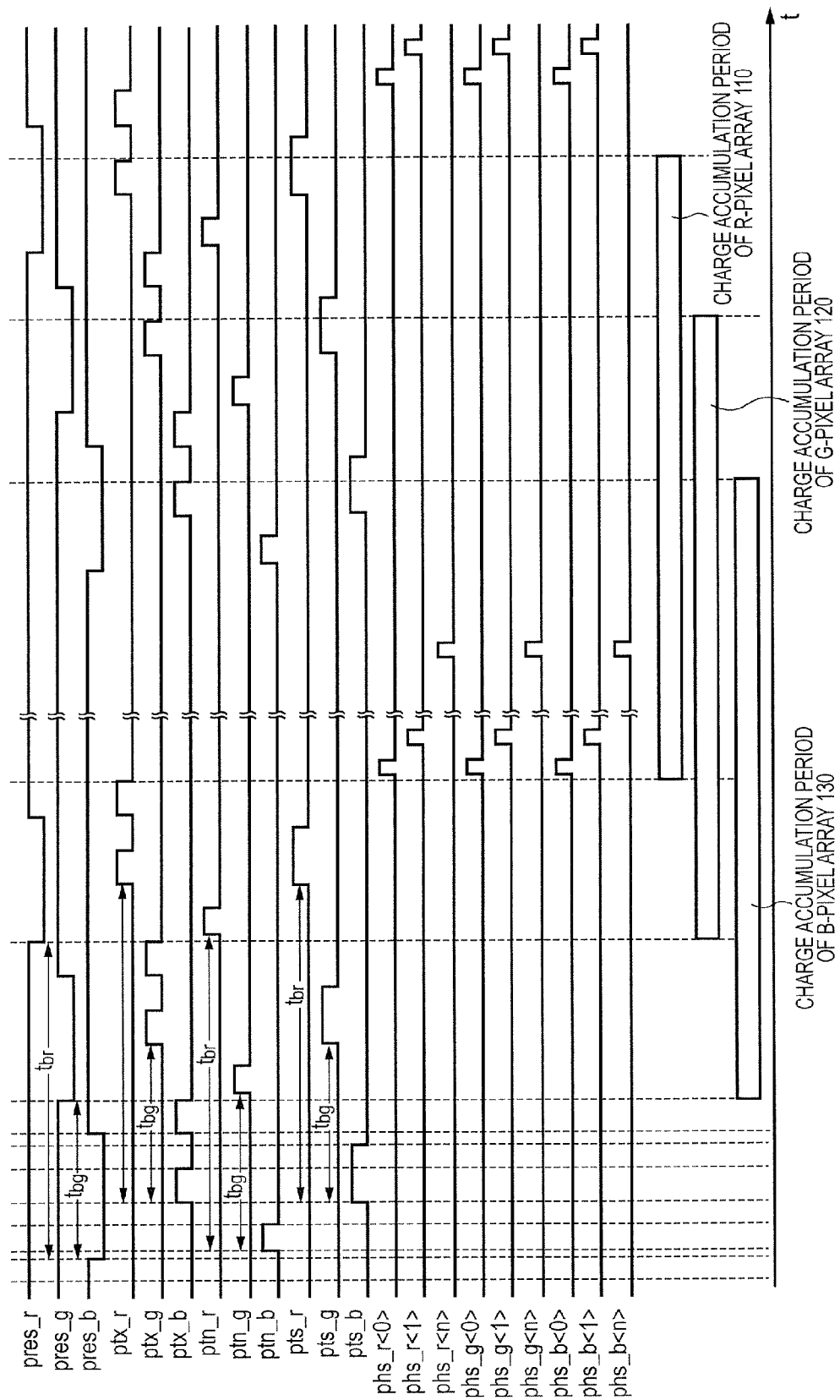
FIG. 6 is a timing chart illustrating the operation of the photoelectric conversion apparatus in FIG. 1.

Incidentally, the setting for the positions of the control pulses for each color in the present embodiment is not limited to the above described content. The color offset in the subsidiary scanning direction can depend on the direction of the subsidiary scanning direction and the alignment order of the color as illustrated in FIG. 5. Because of this, when the direction of the subsidiary scanning direction is changed, a relationship among the color offset quantities of each color is also changed. When the direction of the subsidiary scanning direction has been reversed to that in FIG. 5, for instance, such a setting that the control pulses of the R-pixel array 110 and the G-pixel array 120 are moved by the color offset quantities tbr and tbg with reference to the B-pixel array 130 as illustrated in FIG. 6 becomes an optimal setting for reducing the color offset. For this reason, the setting for the positions of the control pulses for each color is determined according to conditions for use and the generated color offset quantity, and is not limited to the forms illustrated in FIG. 4 and FIG. 6. Accordingly, when the color offset quantity is nil (is such a small level as not to be detectable), the positions of the control pulses of the R-pixel array 110, the G-pixel array 120 and the B-pixel array 130 may be equal, as is illustrated in FIG. 7.

Figure 7:
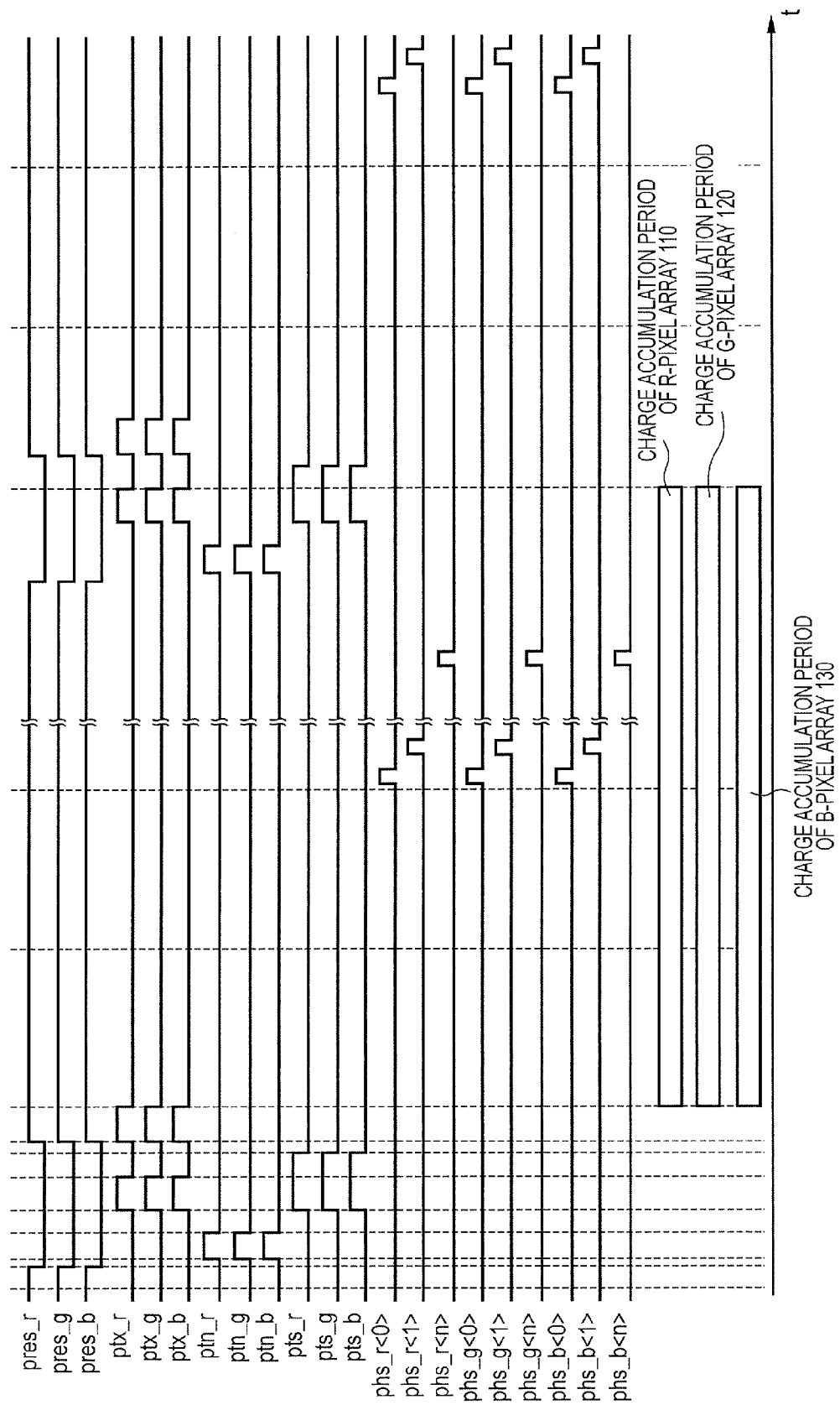
FIG. 7 is a timing chart illustrating the operation of the photoelectric conversion apparatus in FIG. 1.

Incidentally, a positional relationship among the control pulses pres and ptx and the control pulses pts and ptn does not necessarily need to be limited to the relationships illustrated in FIG. 4, FIG. 6 and FIG. 7. However, as has been described above, such a control method can be adopted as to set an equal displacement quantity for all of the pulses in each color so that differences among noise quantities are not caused according to colors, instead of setting the displacement quantity so that any color disturbs a relationship among the pulse positions of the control pulses pres, ptx, pts and ptn.

Figure 11:
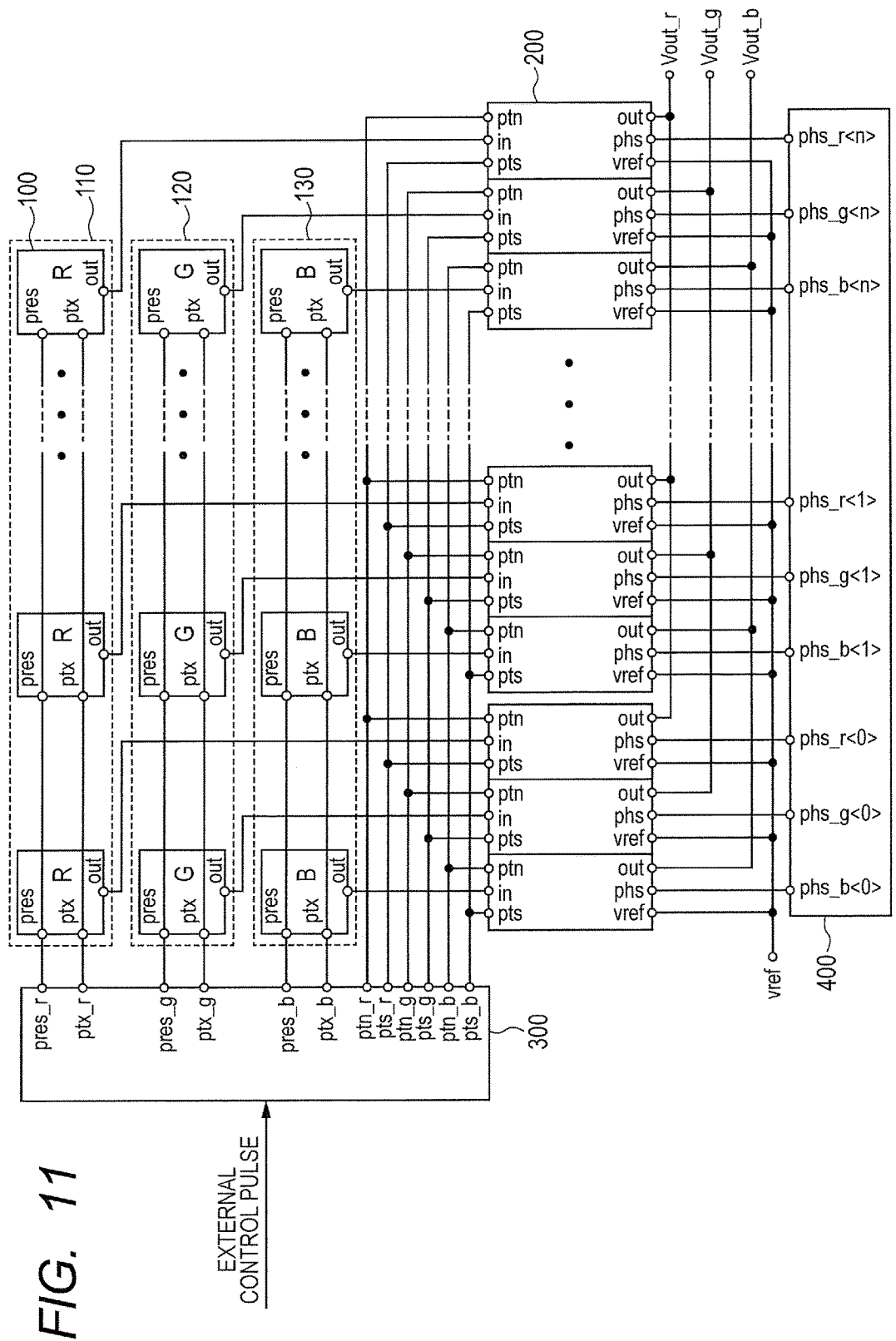
FIG. 11 is a block diagram illustrating a configuration example of a photoelectric conversion apparatus according to one embodiment of the present invention.

In addition, in the present embodiment, the holding unit 200 is configured with two sampling and holding circuits (FIG. 3) for holding the reset signal and the optical signal, but the present embodiment is not limited to this configuration. For instance, the holding unit 200 may be configured with a circuit having such a clamp function as to detect a difference between the reset signal and the optical signal, and an amplifying function. FIG. 11 is a block diagram of a photoelectric conversion apparatus according to the present embodiment in the case where the holding unit 200 is configured with a circuit having the clamp function and the amplifying function. The holding unit 200 corresponding to the R-pixel array 110 outputs the difference between the reset signal and the optical signal to an output terminal Vout_r. The holding unit 200 corresponding to the G-pixel array 120 outputs the difference between the reset signal and the optical signal to an output terminal Vout_g. The holding unit 200 corresponding to the B-pixel array 130 outputs the difference between the reset signal and the optical signal to an output terminal Vout_b. A pixel signal in which the reset component has been removed can be obtained from the above described difference. The holding unit 200 in FIG. 11 is configured with a circuit in FIG. 12.

Figure 12:
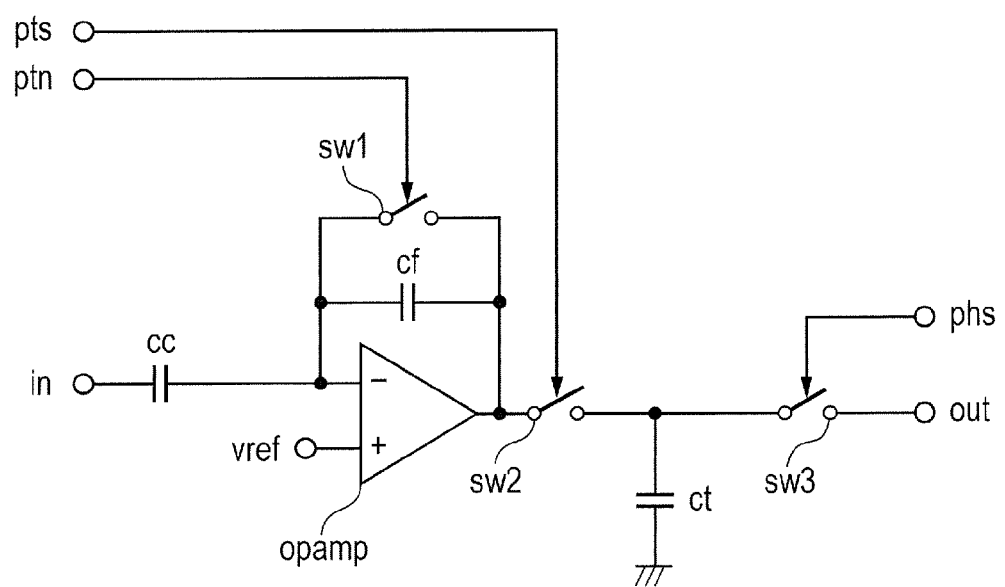
FIG. 12 is a circuit diagram illustrating a configuration example of a holding unit in the block diagram of FIG. 11.

The circuit in FIG. 12 is a sampling and holding circuit which includes: a switched capacitor amplifier configured with an operational amplifier opamp, capacitors cc and cf, a reference voltage vref and a reset switch sw1; switches sw2 and sw3; and a capacitor ct. In FIG. 12, the capacitor cc is an input capacitor of the switched capacitor amplifier, and also can be a clamp capacitor that detects the difference between the reset signal and the optical signal which are sent from the pixel 100. The clamping operation to the capacitor cc is controlled by the reference voltage vref and the closing and opening of the switch sw1 by the pulse ptn. The capacitor ct is a capacitor which holds a difference signal that has been amplified by the switched capacitor amplifier. The sampling operation to the capacitor ct is controlled by the closing and opening of the switch sw2 by the pulse pts. The signal held in the capacitor ct is output to the circuit in the rear stage, when the pulse phs has turned to a high level and the switch sw3 has been turned on.

Figure 13:
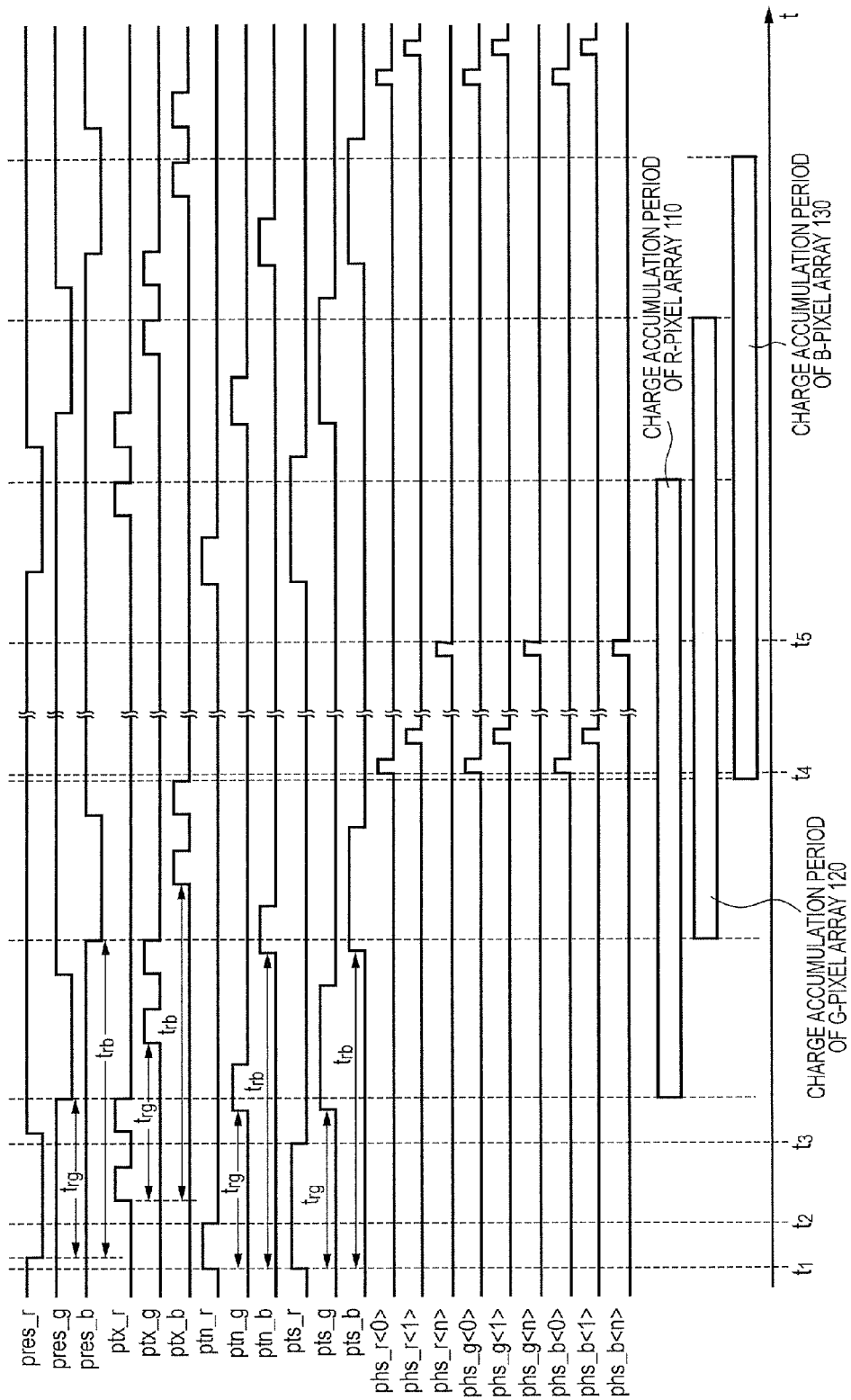
FIG. 13 is a timing chart illustrating an operation of the photoelectric conversion apparatus in FIG. 11.

FIG. 13 is a timing chart illustrating an operation of the photoelectric conversion apparatus in FIG. 11. FIG. 13 is an example having a form in which displacement quantities of the control pulses of each color correspond to those in FIG. 4, and in the following, the description for the part which overlaps with that in FIG. 4 will be omitted. In FIG. 13, when the pulse ptn_r turns to a high level during a period from the time t1 to the time t2, the switch sw1 is thereby turned on, the capacitor cf is reset, and simultaneously the capacitor cc performs an operation of sampling the reset signal of the R-pixel array 110. At the time t2, the pulse ptn_r turns to a low level, and the switch sw1 is turned off. After that, at the time t3, a difference signal between the optical signal and the reset signal of the R-pixel array 110, which has been detected by the capacitor cc, is multiplied by cc/cf, and the resultant signal is held in the capacitor ct.

The above described operation of the circuit, which has been performed for the holding unit 200 corresponding to the R-pixel array 110, is performed also for the holding units 200 each corresponding to the G-pixel array 120 and the B-pixel array 130 similarly, at the timings which are shifted by the color offset quantities trg and trb, respectively. When the reading out operations from the respective pixels 100 to the respective holding units 200 in the R-pixel array 110, the G-pixel array 120 and the B-pixel array 130 have been completed, the control is performed which is shown in the period from the time t4 to the time t5. During the period from the time t4 to t5, the reading out operation from the holding units 200 to the outside is performed by the pulses phs_r, phs_g and phs_b sent from the horizontal scanning circuit 400. The signals of each color, which are output at this time, are signals in a state in which the color offset in the subsidiary scanning direction has been already reduced, and accordingly the above described holding units 200 can provide a similar effect to that in the case of the sampling and holding circuit as in FIG. 3.

Figure 8:
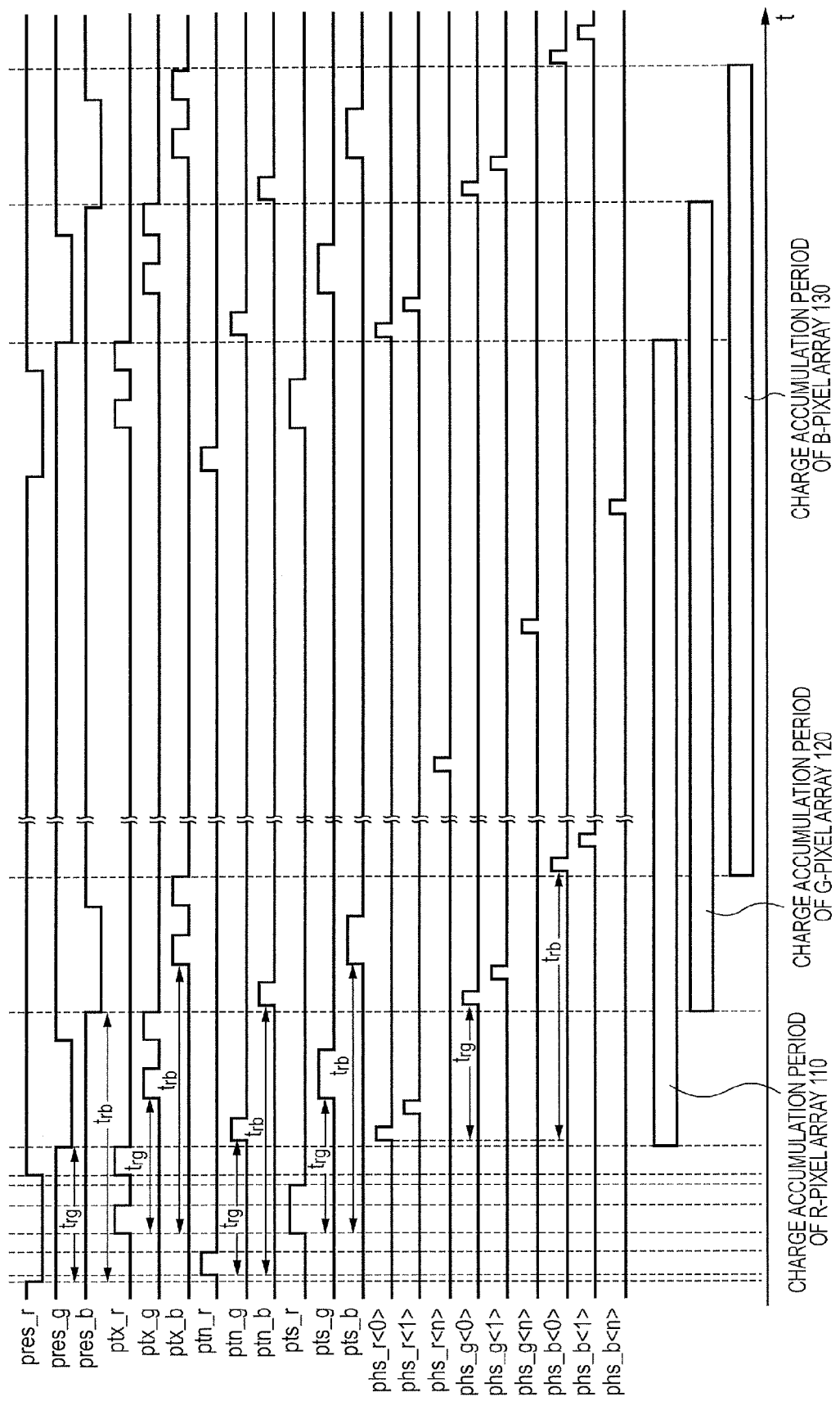
FIG. 8 is a timing chart illustrating the operation of the photoelectric conversion apparatus in FIG. 1.

In addition, in the present embodiment, the reading out operation to the outside is performed when the reading out operations from the pixels 100 to the holding units 200 of all of the colors have been completed as have been described above, but the present embodiment is not limited to this method. For instance, the reading out operation to the outside is performed sequentially from a color of which the reading out operation to the holding unit 200 has been completed, as is illustrated in FIG. 8. Specifically, the pulse controlling unit controls the reading out operation from the holding unit 200 on down, by the pulses phs_r, phs_g and phs_b of the horizontal scanning circuit 400, which are sent according to the pulse positions of the control pulses of each color.

In addition, in the present exemplary embodiment, power source lines for supplying power source voltage therethrough to the pixel arrays and the holding units of each color can cause crosstalk through the power source lines, which occurs because operation timings of each color are different from each other. When the crosstalk should be prevented, the power source may be separated for each color. Alternatively, a common impedance among the power source wires of each color may be reduced.

Figure 15:
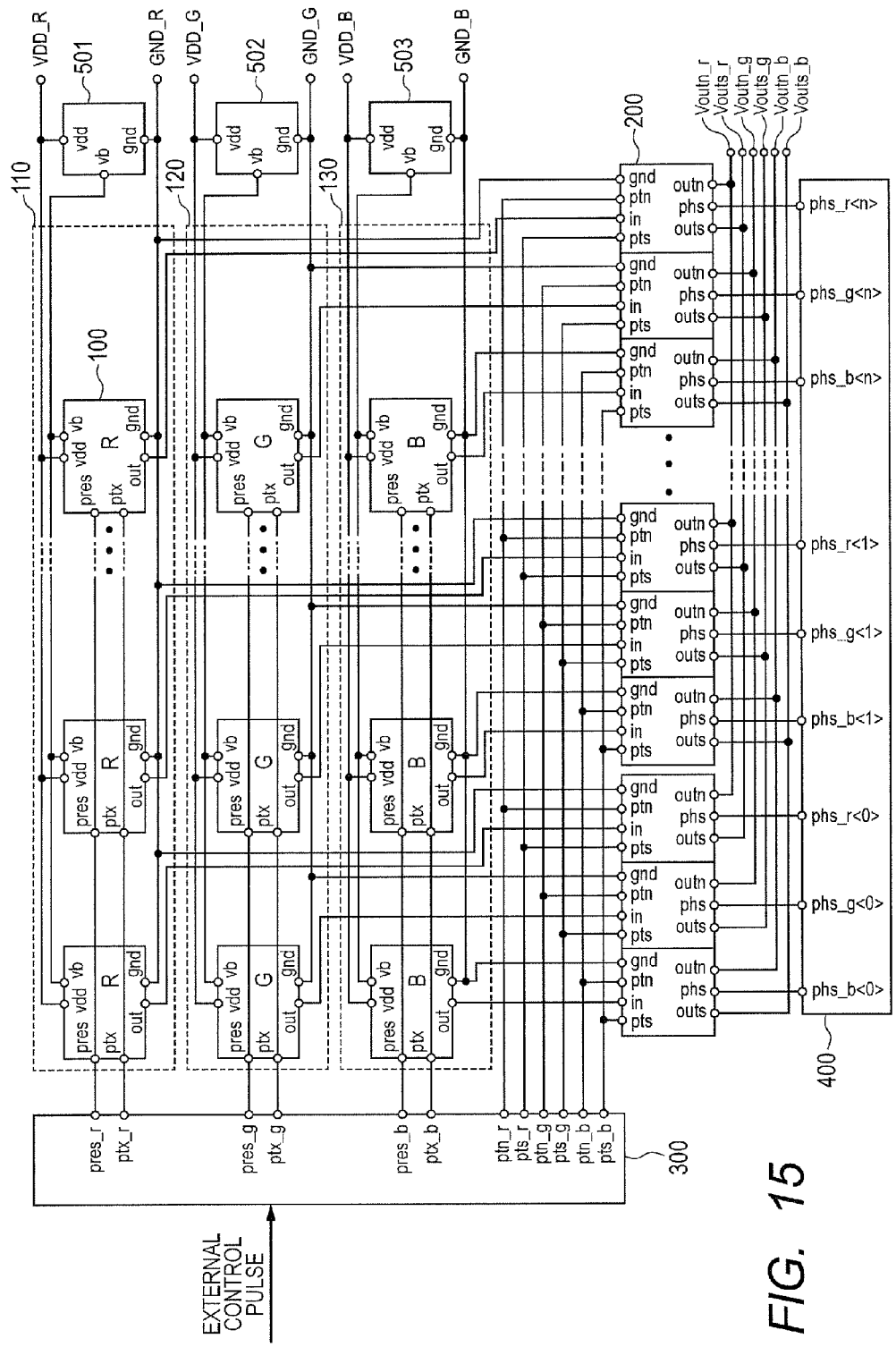
FIG. 15 is a circuit block diagram illustrating an example of a suitable power source connection in the schematic block diagram of FIG. 1.

FIG. 15 illustrates a schematic block diagram illustrating one suitable example of the connection among power source (VDD and GND) wires of each circuit in FIG. 1.

Figure 16:
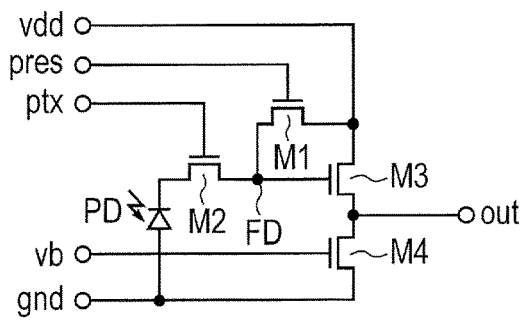
FIG. 16 is an example of a circuit configuration of a pixel in the schematic block diagram of FIG. 15.

FIG. 16 illustrates one example of an equivalent circuit diagram of a pixel 100 in FIG. 15.

In FIG. 16, the transistor M4 can function as a current source which corresponds to the current source Iref in FIG. 2 and which passes a predetermined current according to a difference voltage between bias voltage vb and gnd.

Figure 17:
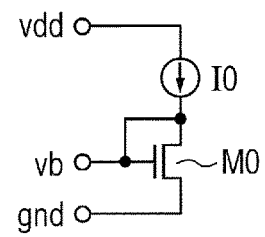
FIG. 17 is an example of a circuit configuration of a bias source circuit in the schematic block diagram of FIG. 15.

In addition, bias source circuits 501, 502 and 503 in FIG. 15 are circuits for generating bias voltages vb which are applied to the pixels 100 of the respective colors, and can be configured with a current mirror circuit which comprises a transistor M0 and a current source I0, as is illustrated in FIG. 17. In addition, the configuration of the holding unit 200 in FIG. 15 can employ a circuit configuration in FIG. 3.

In FIG. 15, VDD_R and GND_R which form a power source for a circuit of Red are electrically connected to the R-pixel array 110, the holding unit 200 corresponding to the R-pixel array 110 and the bias source circuit 501. Similarly, respective sets of VDD_G and GND_G, and VDD_B and GND_B are electrically connected also to each circuit of Green and Blue, respectively. The relationship among VDD_R, VDD_G and VDD_B can be a relationship having higher impedance than that in each wiring, and this relationship is also similar to that among GND_R, GND_G and GND_B.

Thus, by separating power sources for each color, the connection method enables the crosstalk among different colors to be reduced. For instance, in FIG. 4, immediately after the transferring operation of the R-pixel array 110 has been performed at the time t7, the sampling of the reset signal of the G-pixel array 120 is performed. At this time, even though VDD_R, GND_R and the bias potential vb may vary due to the transferring operation of the R-pixel array 110, the power source/bias lines are separated from each other. Because of this, the influence can be reduced which the variation of the power source voltage of Red exerts upon the power source/bias voltage of Green. For this reason, the quantity of the noise can be reduced which results from the variation of the power source/bias voltage and is superimposed on the reset signal of the G-pixel array. Thereby, adequate signal characteristics including little crosstalk among the colors can be obtained. In addition, the above described transient variation of the power source voltage, which has occurred in the other color, is small due to the separation of the power sources, and accordingly the speed of the reading out of the signal can be increased.

Figure 18:
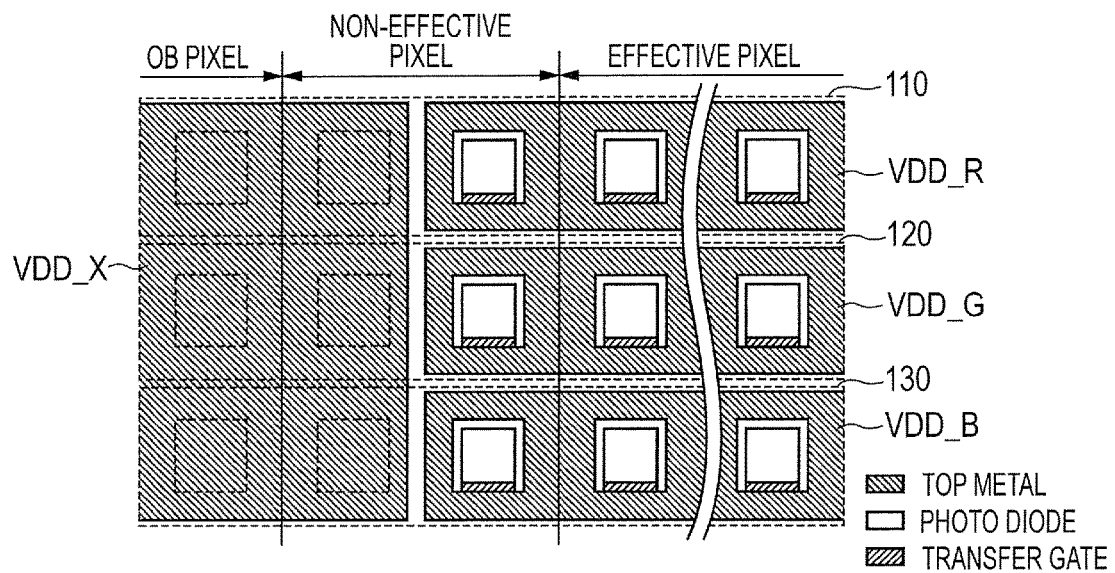
FIG. 18 is a view illustrating an example of a suitable light shield for an OB pixel in the schematic block diagram of FIG. 15.

FIG. 18 is a view describing a suitable light shielding method for OB pixels when power sources for each color have been separated from each other. FIG. 18 is a view illustrating a top plan view of a pixel unit in FIG. 15, and pixel arrays 110, 120 and 130 of each color can be each divided into regions of the OB pixel, a non-effective pixel and an effective pixel.

An opening of a metal which is formed by a top wiring layer is provided on a part of the non-effective pixel and on the top faces of a photo diode and a transfer gate of the effective pixel. In addition, the part of the non-effective pixel and the upper face of the photo diode of the OB pixel are shielded from light by the top wiring layer. The power source wire of the pixel can be used as the metallic wire which is used for the light shield.

When the power sources are separated for each color, there is the case where the power source wires for each color are not easily connected with each other so as to relatively increase the impedance among the power sources for each color. For this reason, gaps among the pixel arrays of each color result in being formed, and the light shielding performance of the OB pixel can be degraded because of the leakage of incident light from the gaps into the pixels. Also when the light shielding unit on the OB pixel is formed of the power source wire of a particular color, a capacitive coupling can occur between the power source wire and the FD of which the colors do not correspond to each other.

Because of this, as is illustrated by VDD_X in FIG. 18, the metallic wire which is used for the light shield of the OB pixel can employ a power source wire which is different from the power source wires of each color and has relatively higher impedance than that of VDD_R, VDD_G and VDD_B.

Figure 19:
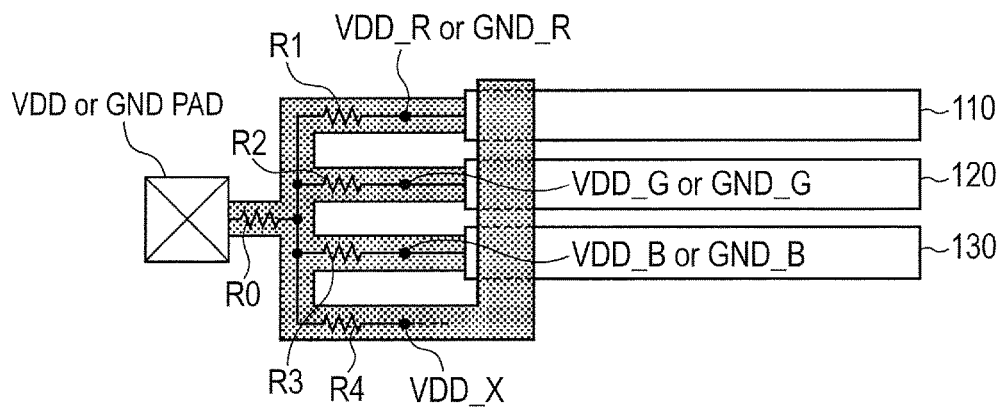
FIG. 19 is a view illustrating an example of power supply from the power source in the schematic block diagram of FIG. 15.

Incidentally, it is ideally desirable that the power sources of each color are completely separated from each other, but a similar effect can be also obtained, for instance, by separating the power source wires in the vicinity of a pad from each other as is illustrated in FIG. 19, depending on a layout structure and a required performance. FIG. 19 is a schematic view illustrating a layout image of power source wires from a pad of VDD or GND to pixel arrays 110, 120 and 130 of each color. In FIG. 19, the VDD_R, the VDD_G, the VDD_B and the VDD_X are power source wires having the same node to which an electric power is supplied from a common pad, but a common impedance R0 can be decreased due to the method of dividing the wiring in the vicinity of the pad. In addition, the impedance among the power source nodes of each of the VDD_R, the VDD_G, the VDD_B and the VDD_X is set so as to be as high as possible due to parasitic resistances R1, R2, R3 and R4. Thereby, the noise which has been generated in each power source node is prevented from being transmitted to another power source node. This method may be similarly applied to the GND_R, the GND_G and the GND_B as well. The method may also be applied to any one set of VDD and GND.

Incidentally, the power source wires are separated from each other not only in the metal wiring but also in a substrate structure such as a well. Thereby, a further high effect of reducing the noise can be obtained.

Figure 9:
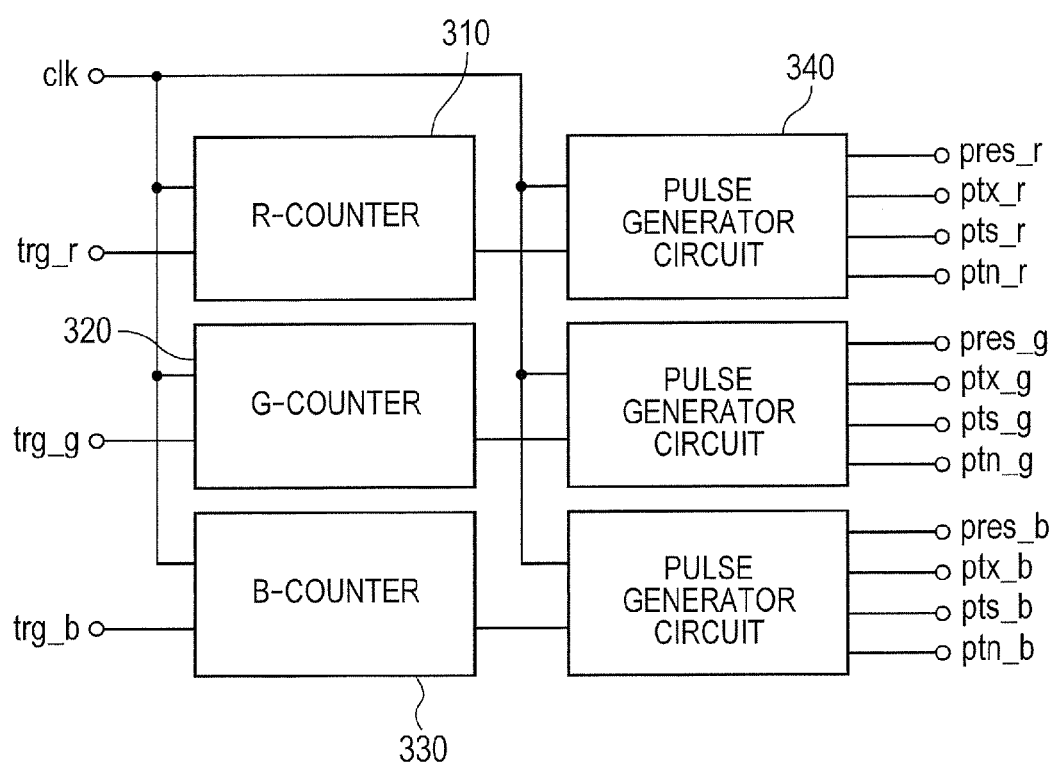
FIG. 9 is a view illustrating a configuration example of a pulse controlling unit in the block diagram of FIG. 1.

Incidentally, a configuration example of the pulse controlling unit 300 in the present embodiment is illustrated in FIG. 9. In FIG. 9, the R-counter 310, the G-counter 320 and the B-counter 330 are counters for counting a clock signal clk, and the start of the counting of each counter is controlled by external control pulses trg_r, trg_g and trg_b. Pulse generating circuits 340 generate control pulses of each color, according to the clock signal clk and the count values of the R-counter 310, the G-counter 320 and the B-counter 330. When the count values of the R-counter 310, the G-counter 320 and the B-counter 330 become a predetermined value, the pulse generating circuits 340 change the states of the control pulses of each color into a low level from a high level or into a high level from a low level, in a form of synchronizing the timings to the clock signal clk. The pulse generating circuit 340 in the rear stage of the R-counter 310 generates control pulses pres_r, ptx_r, pts_r and ptn_r according to the count value of the R-counter 310. The pulse generating circuit 340 in the rear stage of the G-counter 320 generates control pulses pres_g, ptx_g, pts_g and ptn_g according to the count value of the G-counter 320. The pulse generating circuit 340 in the rear stage of the B-counter 330 generates control pulses pres_b, ptx_b, pts_b and ptn_b according to the count value of the B-counter 330.

When the color offset occurs, the external control pulses trg_r, trg_g and trg_b are input so that pulse positions form such relationships as to correspond to the color offset quantities. Thereby, the count starting positions of each of counters 310, 320 and 330 are changed, and the pulse controlling unit can independently control the positions of the control pulses of each color.

Figure 10:
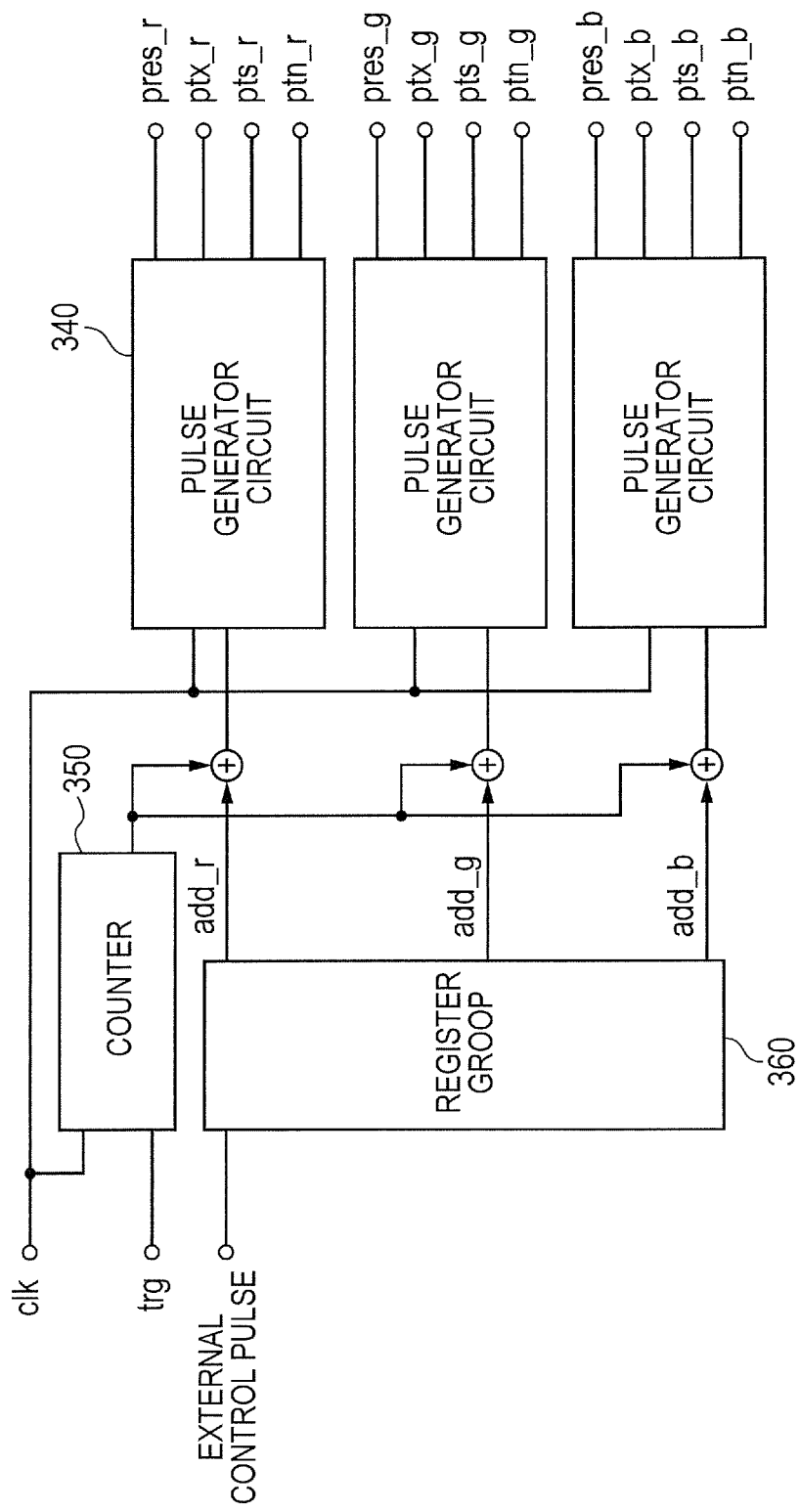
FIG. 10 is a view illustrating a configuration example of the pulse controlling unit in the block diagram of FIG. 1.

As has been described above, in FIG. 9, a circuit configuration has been described which adjusts the positions of the control pulses of each color by independently providing counters 310, 320 and 330 for each color, but the configuration of the pulse controlling unit 300 in the present embodiment is not limited to this configuration. For instance, the pulse controlling unit 300 may be configured as is illustrated in FIG. 10. A register group 360 can rewrite stored data by the external control pulses. One counter 350 starts the counting of the clock signal clk, by an external control pulse trg. Data add_r, add_g and add_b in the register group 360 are added to the count value of the counter 350, and are output to three pulse generating circuits 340 of each color. The three pulse generating circuits 340 of each color input the above described added values thereinto, and generate the control pulses of each color.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-043765, filed Feb. 28, 2012, which is hereby incorporated by reference herein in its entirety.

What is claimed is:

1. A system comprising:
a photoelectric conversion apparatus including a plurality of pixel arrays, each pixel array including a plurality of pixels, each pixel corresponding to each of colors different from each other, and a pulse controlling unit generating a control pulse for the pixel array;
an analog-to-digital converter configured to convert into a digital signal from an analog signals outputted from the photoelectric conversion apparatus;
a signal processing unit configured to receive the digital signal from the analog-to-digital converter; and
a color offset calculating unit configured to receive a signal from the signal processing unit, wherein
the plurality of pixel arrays are arranged each abutting side by side along a first direction, the plurality of pixels in each of the pixel arrays are arranged along a second direction different from the first direction,
the photoelectric conversion apparatus scans a document relatively in the first direction, and
the pulse controlling unit receives a color offset signal from the color offset calculating unit.

2. The systems according to claim 1, wherein the pulse controlling unit generates the control pulse for controlling an accumulation period of the pixel.

3. The systems according to claim 1, wherein the control pulse includes a reset pulse controlling a reset operation of the pixel, a transfer pulse controlling an operation of transferring an electric charge generated in a photoelectric conversion portion in the pixel, and a read out pulse controlling an operation of sampling and holding of a signal of the pixel.

4. The systems according to claim 3, wherein the pulse controlling unit controls variation quantities of pulse positions of the reset pulse, the transfer pulse and the read out pulse, by color offset quantities which are fixed for each color.

5. The systems according to claim 1, wherein the color offset calculating unit calculates color offset quantities in a subsidiary scanning direction at a scanning a pattern image for correction by the plurality of pixel arrays, and
the pulse controlling unit generates the control pulse for the pixel array for each color, based on the color offset quantities calculated by the color offset calculating unit.

6. The systems according to claim 1, wherein the pulse controlling unit has counters each arranged correspondingly to each of colors of the plurality of pixel arrays, and generates the control pulse based on a pulse from each of the counters.

7. The systems according to claim 1, wherein the pulse controlling unit has counter arranged commonly to colors of the plurality of pixel arrays, and registers each arranged correspondingly to each of colors of the plurality of pixel arrays, and generates the control pulse based on pulses from the counter and the registers.

* * * * *